US012757067B2

(12) United States Patent
Contigiani et al.

(10) Patent No.: US 12,757,067 B2
(45) Date of Patent: Oct. 6, 2026

(54) OPTIMIZING BITRATE ADAPTION TO SUDDEN BANDWIDTH CHANGES BASED ON INFERRED NETWORK CHARACTERISTICS

(71) Applicant: Apple Inc., Cupertino, CA (US)

(72) Inventors: Omar Contigiani, La Jolla, CA (US); Ashwin Ramesh, Milpitas, CA (US); Christopher M. Garrido, Santa Clara, CA (US); Erik Vladimir Ortega Gonzalez, Cupertino, CA (US); Hsien-Po Shiang, San Jose, CA (US); Ming Jin, Saratoga, CA (US); David L. Biderman, San Jose, CA (US); Jingwen Du, Sunnyvale, CA (US); Ka Ki Lai, Santa Clara, CA (US); Karthick Santhanam, Campbell, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 18/733,454

(22) Filed: Jun. 4, 2024

(65) Prior Publication Data

US 2024/0406795 A1 Dec. 5, 2024

Related U.S. Application Data

(60) Provisional application No. 63/471,161, filed on Jun. 5, 2023.

(51) Int. Cl.

| | |
|---|---|
| ***G06F 15/173*** | (2006.01) |
| ***H04L 41/16*** | (2022.01) |
| ***H04L 47/25*** | (2022.01) |
| ***H04W 28/02*** | (2009.01) |

(52) U.S. Cl.

CPC ......... *H04W 28/0289* (2013.01); *H04L 41/16* (2013.01); *H04L 47/25* (2013.01)

(58) Field of Classification Search

None

See application file for complete search history.

(56) References Cited

U.S. PATENT DOCUMENTS

| | | | | |
|---|---|---|---|---|
| 2017/0099587 | A1* | 4/2017 | Patel | H04W 28/0284 |
| 2023/0010512 | A1* | 1/2023 | Sharma | H04L 47/25 |
| 2023/0318980 | A1* | 10/2023 | Wei | H04N 19/172 709/219 |
| 2024/0155422 | A1* | 5/2024 | Chisu | H04W 28/0284 |

* cited by examiner

*Primary Examiner* — Padma Mundur

(74) *Attorney, Agent, or Firm* — Fish & Richardson P.C.

(57) ABSTRACT

Methods and systems are for receiving network data representing a quality of a communication link in a network, the network data comprising a bandwidth value representing an available bandwidth for the communication link; detecting, based on the network data, that the available bandwidth has changed or will change from a first bandwidth level to a second bandwidth level; determining a probability that the network is congested; when the probability satisfies a threshold value, adjusting a bitrate for the communications link to a first value that enables network congestion to clear; when the probability does not satisfy the threshold value, adjusting the bitrate for the communications link to a second value that fully utilizes the second bandwidth level.

16 Claims, 5 Drawing Sheets

OPTIMIZING BITRATE ADAPTION TO SUDDEN BANDWIDTH CHANGES BASED ON INFERRED NETWORK CHARACTERISTICS

CLAIM OF PRIORITY

This application claims priority under 35 U.S.C. § 119 (e) to U.S. Patent Application Ser. No. 63/471,161, filed on Jun. 5, 2023, the entire contents of which are hereby incorporated by reference.

TECHNICAL FIELD

This disclosure relates generally to wireless communications.

BACKGROUND

Existing and new services will move into new device categories and will expand from local to un-tethered cellular usage. However, cellular connectivity comes with inevitable challenges including bad coverage, low throughput, and highly dynamic network load and varying scheduling latencies.

SUMMARY

This application describes data processing systems and processes for optimizing bitrate adaption to sudden bandwidth changes in real time communications based on inferred network characteristics. A data processing system is configured to monitor bandwidth and network congestion for a communications link. The communications link can be wired or wireless. The communications link can be a part of a given communications network (e.g., a cellular network, a WiFi network, an ethernet connection, etc.). The data processing system is configured to anticipate a drop in an available bandwidth and predict sustained network congestion responsive to the drop in bandwidth. The data processing system is configured to detect and react immediately (e.g., in less than one second) to adjust a bitrate for the monitored communications link. The data processing system controls the bitrate to a level that enables network congestion to clear for the communications link while enabling a maximum or near maximum bitrate based on the available bandwidth. The data processing system is configured to avoid underutilizing the available bandwidth and also clear network congestion.

The systems and processes described herein enable one or more of the following advantages. The data processing system is configured to enable a nearly instant (e.g., within 100-500 milliseconds (ms)) bitrate correction responsive to a sudden, unexpected drop in available bandwidth. The data processing system controls the bitrate for a communication (e.g., a transmission) based on the available bandwidth. The data processing system avoids underutilizing available bandwidth by correcting the bitrate to match the available bandwidth. The data processing system reacts quickly to avoid causing network congestion or reduce network congestion to a minimal, non-disruptive amount. For example, the near-instant reaction (within one second) to reduced bandwidth enables the data processing system to avoid filling data queues for a sustained period. The data processing system reduces latencies experienced after the available bandwidth level drops, and the result is a non-disruptive latency. In a video streaming context, there may be no observable latency or disruption to the video stream. In another example, the data processing system can reduce or eliminate media artifacts that result from network congestion.

The data processing system controls the bitrate to recover to the nominal level based on the long-term available bandwidth. Because the data processing system reacts quickly and thus reduces network congestion to a minimum, the data processing system avoids requiring the bitrate to be below a nominal level for more than a short period of time (e.g., a second). The data processing system is configured to increase the bitrate to match the available real bandwidth after network congestion is cleared. The real bandwidth is an estimated value based on the network data inputs. The period of reduced bitrate below the available bandwidth level, which is used to clear the network congestion, is reduced or eliminated. The data processing system can raise the bitrate instantly back to a level that is supported by the available bandwidth. The data processing system avoids a scenario in which the bitrate is slowly ramped back up until a maximum bitrate is determined. Rather, the data processing system instantly steps the bitrate back up to a maximum level that is supported by the available bandwidth.

The data processing system corrects a bitrate for a communication link in a manner that is customized for the particular network. For example, the data processing system is configured to analyze (e.g., learn) network behavior for each particular network. The data processing system's predicted bandwidth and the resulting corrections made to the bitrate are based on the past network behavior for that particular network. The customized analysis for each network further reduces a delay for adjusting bitrate based on a detected bandwidth drop and predicted network congestion. The further reduction in responsiveness for correcting bandwidth further reduces network congestion and consequently reduces a delay before the data processing system restores the bitrate to a nominal level based on the detected bandwidth. In other words, because the network congestion is further reduced, the data processing system does not need as much time to clear network congestion. The data processing system shortens the period in which the bitrate is suboptimal, which enables network congestion to clear, and restores the nominal bitrate more quickly than if the response was not customized based on the particular behavior of the network.

The disclosed techniques are realized by one or more implementations, which include the following as described in the examples section below.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
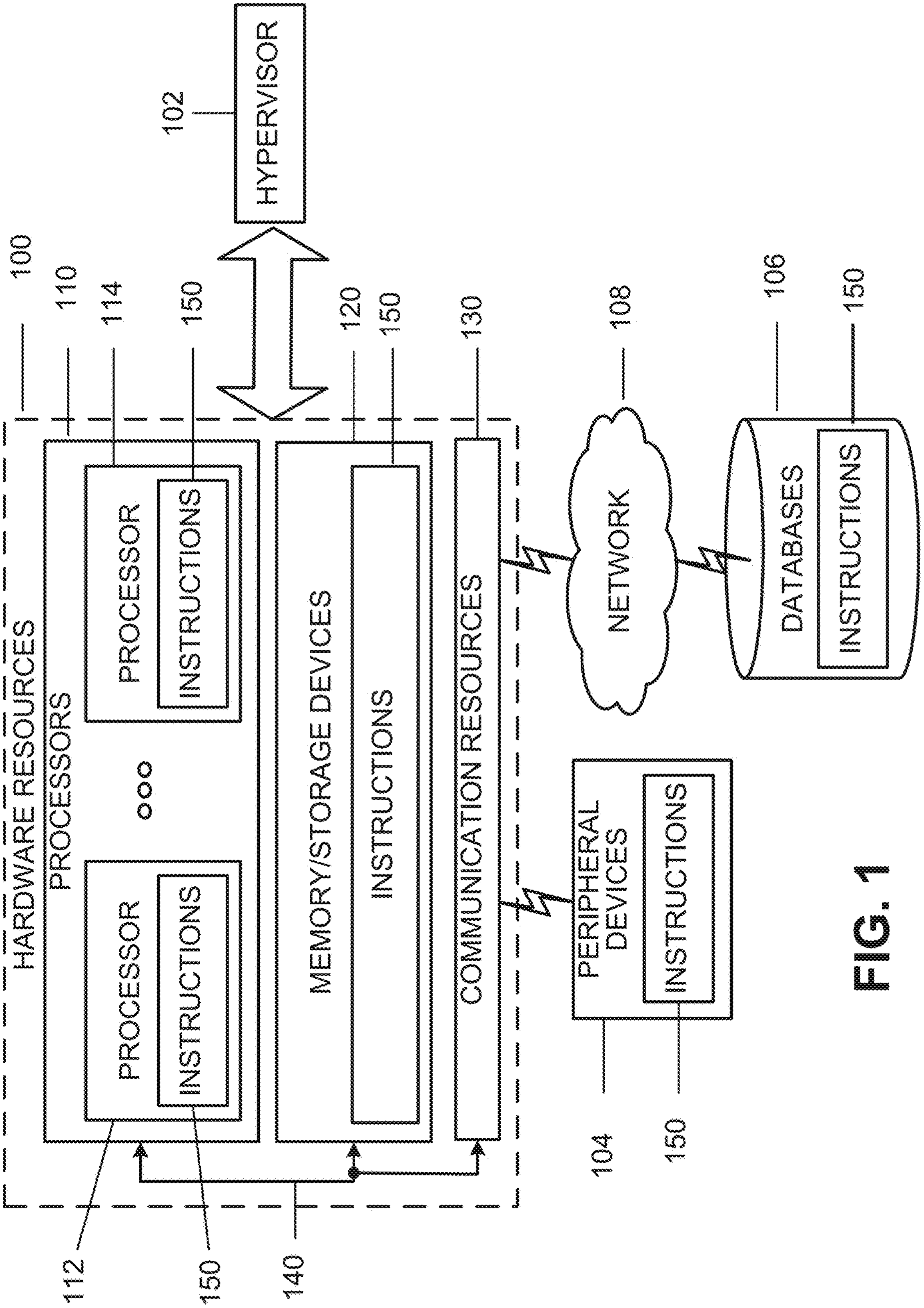
FIG. 1 illustrates an example wireless communication system, according to various implementations herein.

This application describes data processing systems and processes for optimizing bitrate adaption to sudden bandwidth changes in real time communications based on inferred network characteristics. A data processing system is configured to monitor bandwidth and network congestion for a communications link. The communications link can be wired or wireless. The communications link can be a part of a given communications network (e.g., a cellular network, a WiFi network, an ethernet connection, etc.). The data processing system is configured to anticipate a drop in an available bandwidth and predict sustained network congestion responsive to the drop in bandwidth. The data processing system is configured to detect and react immediately (e.g., in less than one second) to adjust a bitrate for the monitored communications link. The data processing system controls the bitrate to a level that enables network congestion to clear for the communications link while enabling a maximum or near maximum bitrate based on the available bandwidth. The data processing system is configured to avoid underutilizing the available bandwidth and clear network congestion.

The data processing system includes a bandwidth classifier and a congestion predictor. The bandwidth classifier is configured to determine when an available bandwidth has changed such that the data processing system reduces the bitrate of a data stream to avoid network congestion. The bandwidth classifier can set a threshold change in the bandwidth that triggers a response by the data processing system. The bandwidth classifier can extract a particular data signature from a set of input data associated with the communication link to determine which network behaviors represent a change in bandwidth such that a response is triggered.

The congestion predictor is configured to determine if network congestion is persisting or will persist based on the current bitrate of the data communication link. The data processing system sets the bitrate based on whether the congestion predictor determines that the network is congested or not. If the network is congested, the data processing system sets the bitrate at a sub-nominal level to allow congestion to clear. Once the congestion predictor determines that the network is no longer congested, the data processing system can instant raise the bitrate to a nominal level that corresponds to the current available bandwidth. The data processing system's instant correction of the bitrate contrasts with an iterative scenario in which the bitrate is slowly ramped up over time, which results in a sustained period of sub-nominal bitrate based on the corresponding available bandwidth. A slow ramp up can result in observable latencies in a data stream (e.g., in a video stream) and/or media artifacts. The data processing system instantly steps up the bitrate to a level that avoids network congestion but provides optimal link performance. Each of the congestion predictor and the bandwidth classifier are further described in greater detail.

Real-time or near real-time processing refers to a scenario in which received data are processed as made available to systems and devices requesting those data immediately (e.g., within milliseconds, tens of milliseconds, or hundreds of milliseconds) after the processing of those data are completed, without introducing data persistence or store-then-forward actions. In this context, a real-time system is configured to process a data stream as it arrives, and output results as quickly as possible (though processing latency may occur). Though data can be buffered between module interfaces in a pipelined architecture, each individual module operates on the most recent data available to it. The overall result is a workflow that, in a real-time context, receives a data stream and outputs processed data based on that data stream in a first-in, first out manner. However, non-real-time contexts are also possible, in which data are stored (either in memory or persistently) for processing later. In this context, modules of the data processing system do not necessarily operate on the most recent data available.

In addition to real-time processing of network metrics to predict congestion and classify bandwidth behavior, the data processing system is configured to perform a continuous or nearly continuous analysis of the network for updating outputs. In this context, a continuous or nearly continuous analysis includes a computation resolution of less than 50 milliseconds. For example, the data processing system is configured to periodically compute an output value for the bandwidth classifier and/or the congestion predictor (e.g., every 20 ms or so). Though the calculation is periodic, the period (20 ms) is small enough that the data processing system appears, to other systems in the network, to continuously control the bitrate of the communication link. The data processing system appears to instantly control the bitrate responsive to changes in the available bandwidth.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

FIG. 1 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 1 shows a diagrammatic representation of hardware resources 100 including one or more processors (or processor cores) 110, one or more memory/storage devices 120, and one or more communication resources 130, each of which may be communicatively coupled via a bus 140. For embodiments where node virtualization (e.g., NFV) is utilized, a hypervisor 102 may be executed to provide an execution environment for one or more network slices/sub-slices to utilize the hardware resources 100.

The processors 110 may include, for example, a processor 112 and a processor 114. The processor(s) 110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 120 may include main memory, disk storage, or any suitable combination thereof. The memory/storage devices 120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 130 may include interconnection or network interface components or other suitable devices to communicate with one or more peripheral devices 104 or one or more databases 106 via a network 108. For example, the communication resources 130 may include wired communication components (e.g., for coupling via USB), cellular communication components, NFC components, Bluetooth® (or Bluetooth® Low Energy) components, Wi-Fi® components, and other communication components.

Instructions 150 may comprise software, a program, an application, an applet, an app, or other executable code for causing at least any of the processors 110 to perform any one or more of the methodologies discussed herein. The instructions 150 may reside, completely or partially, within at least one of the processors 110 (e.g., within the processor's cache memory), the memory/storage devices 120, or any suitable combination thereof. Furthermore, any portion of the instructions 150 may be transferred to the hardware resources 100 from any combination of the peripheral devices 104 or the databases 106. Accordingly, the memory of processors 110, the memory/storage devices 120, the peripheral devices 104, and the databases 106 are examples of computer-readable and machine-readable media.

Figure 2:
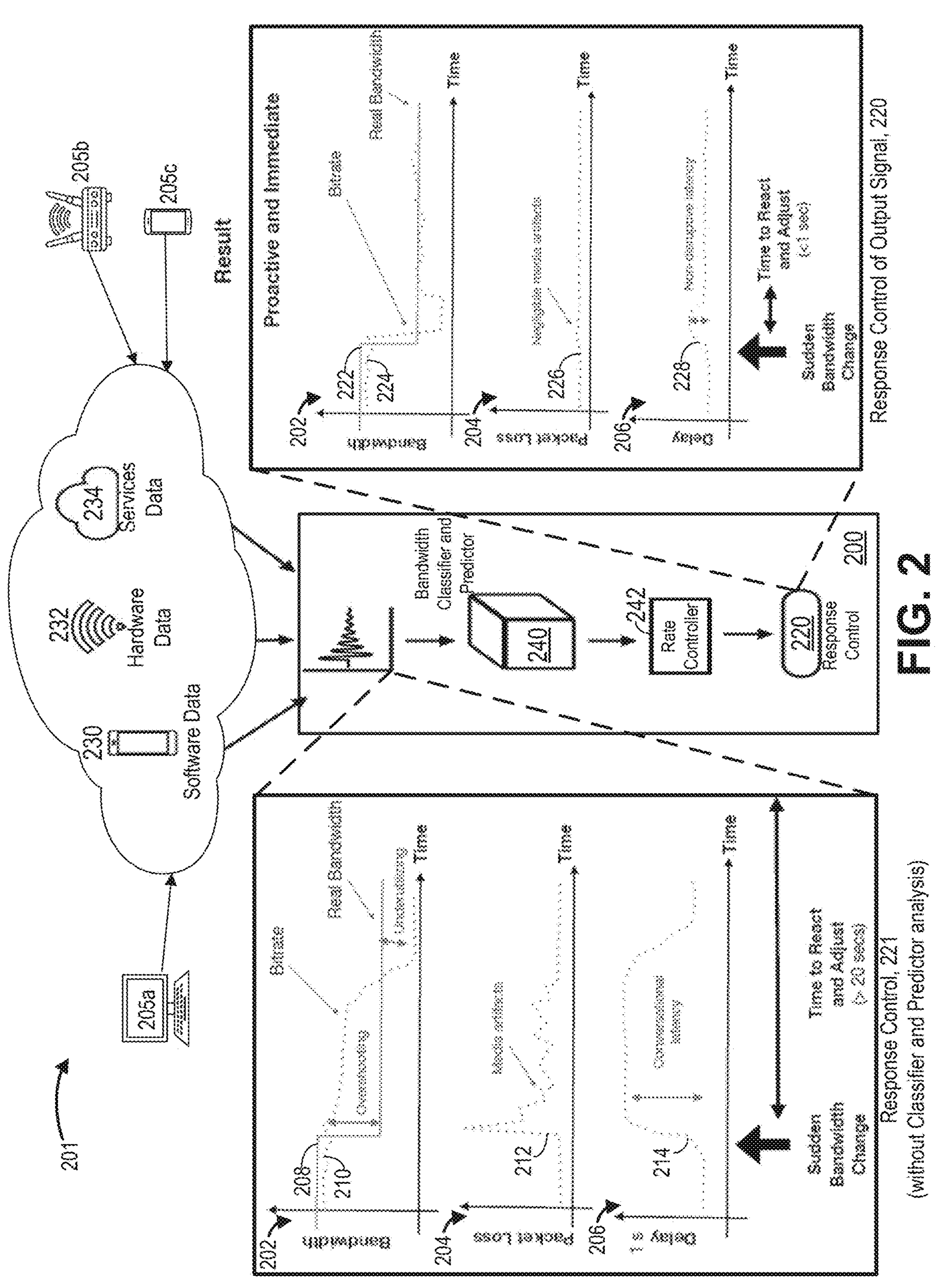
FIG. 2 illustrates an example of a bitrate adaption system that includes a bandwidth classifier and predictor.

FIG. 2 illustrates an example of a bitrate adaption data processing system 200 that includes a bandwidth classifier and predictor in a network 201. The data processing system 200 is configured to process data from the network 231 that represents the behavior of the network. Based on the data from the network 231, the data processing system is configured to control the bitrate of a given communications link within the network. In some implementations the data processing system is part of a system configured to transmit data across the network 231 to one or more other devices, such as a client terminal 205*a* or a router 205*b*. In some implementations, the data processing system 200 is part of a server system on the network 201. In this example, the data processing system 200 can be part of a data streaming service that determines what bitrate to stream data to a client device. In some implementations the data processing system 200 is operating on a client device such as a client terminal 205*a*, and the data processing system 200 determines how much data to send across a communication link to a server or other client device. In some implementations, the data processing system 200 is part of a user equipment in a cellular network, such as a mobile phone 205*c*.

The data processing system 200 is configured to receive various inputs data 230, 232, 234 from sources 205*a-c* in the network 201. The input data can include software data 230. The input data include hardware data 232. The input data include services data 234. These data 230, 232, and 234 together can represent the behavior of a particular network. For example, the data 230, 232, and 234 can indicate, to the data processing system 200, a bitrate, a one-way transmission delay, a packet loss metric, audio/video streaming metrics, round trip time, and so forth.

These network data represent what data are being sent into the network and how the network is reacting. The receiver sends back some feedback indicating how long a message took to be received from the sender (how long it takes for messages to reach the receiver) and how much of the data has been lost (e.g., packet loss) for each of the audio stream and the video streams. This is because these two metrics react differently. Another metric includes a round trip time which is how long it takes for a message to be sent and acknowledged. This is measured to determine where delays are being introduced (from sender to receiver or from receiver to sender). If data being sent is delayed, this can represent network congestion. In some implementations, bitrate represents data sent into the network and feedback metrics represent how the network is reacting to the data.

The data processing system 200 is configured to analyze the input data 230, 232, 234 to classify the current bandwidth level and predict whether the communication link of the network 201 is experiencing congestion. The data processing system 200 includes A bandwidth classifier and predictor 240. The bandwidth classifier and predictor 240 is configured to interpret the input signals 230, 232, and 234 to determine when bandwidth has changed such that a reduction in bitrate should occur. The data processing system 200 is configured to detect a change in bandwidth level and immediately control the bitrate to track the real bandwidth at a level that utilizes the available bandwidth without either exceeding or underutilizing the available bandwidth.

The data processing system 200 detects a change in bandwidth based on an analysis of network behavior over a time period. The data processing system 200 is therefore configured to understand when the bandwidth change requires that bitrate should also be changed. In some implementations the bandwidth classifier is based on a machine learning engine analysis. The machine learning engine can be trained to analyze input data including software data 230, hardware data 232, and services data 234. The software data 230 can include application performance measured by the receiving device, such as detected latencies, packet loss, response times, and so forth. The hardware data 232 can include data representing the physical signal such as a Wi-Fi strength, a reference signal receive power (RSRP), a reference signal receive quality (RSRQ), a signal to noise ratio (SINR), and so forth. The service data 234 can include data generated by the transmitting device such as a server system. This can corroborate the measured receiver metrics that are received from the receiver as previously described.

The bandwidth classifier can determine when a change in real bandwidth represents a need to change the bitrate level and when a change in real bandwidth does not require a change to the bitrate level. The real bandwidth is an estimated value for the bandwidth based on the network data including the software data 230, hardware data 232, and the services data 234. The machine learning engine is configured to process the input data in real time or near real time such that the bitrate level can be controlled instantaneously or near instantaneously. For example, the machine learning engine is configured to process the input data in about 1 millisecond. Because the data processing system 200 immediately responds to changes in real bandwidth, the amount of network congestion is minimized, and therefore a recovery time is also minimized as less network congestion occurs (e.g., than would otherwise occur without the bandwidth classifier analysis and control).

The bandwidth classifier can be trained using historical data for a particular network, a particular device, or a combination thereof. For example, the bandwidth classifier can be trained based on historical data to recognize patterns associated with changes in the available bandwidth. The patterns can be associated with a particular network type, a particular communications link type, a particular device, or combination thereof. Based on this pattern recognition, the data processing system 200 is configured to immediately recognize when a change in a bandwidth level will represent a sufficient change in available bandwidth such that a change to the bitrate will be preferable.

The data processing system 200 includes a congestion predictor. The congestion predictor is configured to determine a probability that the network remains congested and that the controlled bitrate should allow for congestion to clear before being raised to utilize the real bandwidth level. The congestion predictor enables the data processing system 200 to immediately raise the bitrate to fully utilize available bandwidth when network congestion clears. The immediate control of the bitrate avoids underutilization of the real bandwidth level of the network for a period that is longer than necessary to clear congestion. In other words, the congestion predictor enables full utilization of real bandwidth while also allowing the network congestion to clear. Because the data processing system 200 reacts instantly to changes in real bandwidth, and because the data processing system immediately raises bitrates to fully utilize real bandwidth once network congestion is cleared, the user experience is minimally impacted.

The congestion predictor can be trained using historical data for a particular network, a particular device, or a combination thereof. For example, the congestion predictor can be trained based on historical data to recognize patterns associated with changes in the available bandwidth and the corresponding bitrate level. The patterns can be associated with a particular network type, a particular communications link type, a particular device, or combination thereof. Based on this pattern recognition, the data processing system 200 is configured to immediately recognize when the network is no longer congested and enable the rate control module 330, subsequently described, to adjust the bit rate to fully utilize the available bandwidth level.

In some implementations the bandwidth classifier and/or the congestion predictor can be continuously trained when an associated device is performing operations over the network. For example, a pretrained model for the bandwidth classifier and/or the congestion predictor can be stored with a particular device (e.g., based on the device type). The pre-trained model can then be continuously updated (e.g., trained) while the device is being used. The model can be stored within the context of the particular network environment that the device is experiencing. For example, when the device is in a WiFi network, a first version of the bandwidth classifier and/or the congestion predictor is used. For example, when the device is in a cellular network, a second, different version of the bandwidth classifier and/or the congestion predictor is used. The first or second version of the bandwidth classifier and/or the congestion predictor can be loaded based on the network that is in use.

The response control 221 shows an example of controlling the bitrate without bandwidth classification and/or congestion prediction. As shown in bandwidth response graph 202, a bandwidth level 208 sharply drops at a given time. The data processing system 200 is slow to realize this is occurring (e.g., 20 seconds or more). During this initial period, the bitrate level 210 overshoots the available bandwidth 208. During this period, network congestion builds. The network 201 must clear this congestion before raising the bitrate back to a nominal level corresponding to the available bandwidth. During this congestion clearance period, the bitrate 210 underutilizes the available bandwidth as the controller slowly raises the bitrate until the correct level is determined.

The slow control of response 221 causes several issues. First, as shown in packet loss graph 204, the network experiences a sharp increase in packet loss levels 210 while the bitrate level 210 overshoots the bandwidth level 208. A data stream can lose enough packets to cause issues such as media artifacts, disrupting a user experience. In addition, as shown in delay graph 206, a data latency level 214 can rise to several seconds or more for a sustained period, impacting the user experience. For example, the additional latencies may cause conversational latency in a phone call or video stream, disrupting use of the communication link. The time to react, reduce and eliminate network congestion, and return to proper utilization of the available bandwidth may take an order of several seconds or many seconds (e.g., 20 seconds or more).

In contrast to the response control 221, a response control 220 is shown that includes a control of the bitrate responsive to analysis by the bandwidth classifier and the congestion predictor of the data processing system 200. The bandwidth graph 202 shows a real bandwidth level 222 sharply drop at a given point in time. In contrast to the response control 221, when the data processing system utilizes A bandwidth classifier and congestion predictor, the data processing system is configured to adjust the bitrate nearly instantly to track the available bandwidth. For example, the bitrate level 224 can be adjusted by the data processing system 200 within a second (e.g., within 200-500 ms or less).

The nearly instant response to the change in real bandwidth 222 by the data processing system 200 results in almost zero impact to the user experience. The data processing system 200 is configured to immediately raise the bitrate back to properly utilize the real bandwidth level 222 once network congestion clears and the bandwidth level 222 stabilizes. Therefore, the data processing system 200 uses more of the available bandwidth than for response control 221. For example, as packet loss graph 204 shows there is hardly any rise in packet loss levels 226. There are negligible media artifacts that occur as a result of the changing bandwidth. As shown in graph 206, the data processing system 200, using the bandwidth classifier and congestion predictor minimizes a packet delay 228. a user therefore experiences a non-disruptive latency in a data stream such as a video data stream or a phone call.

Figure 3:
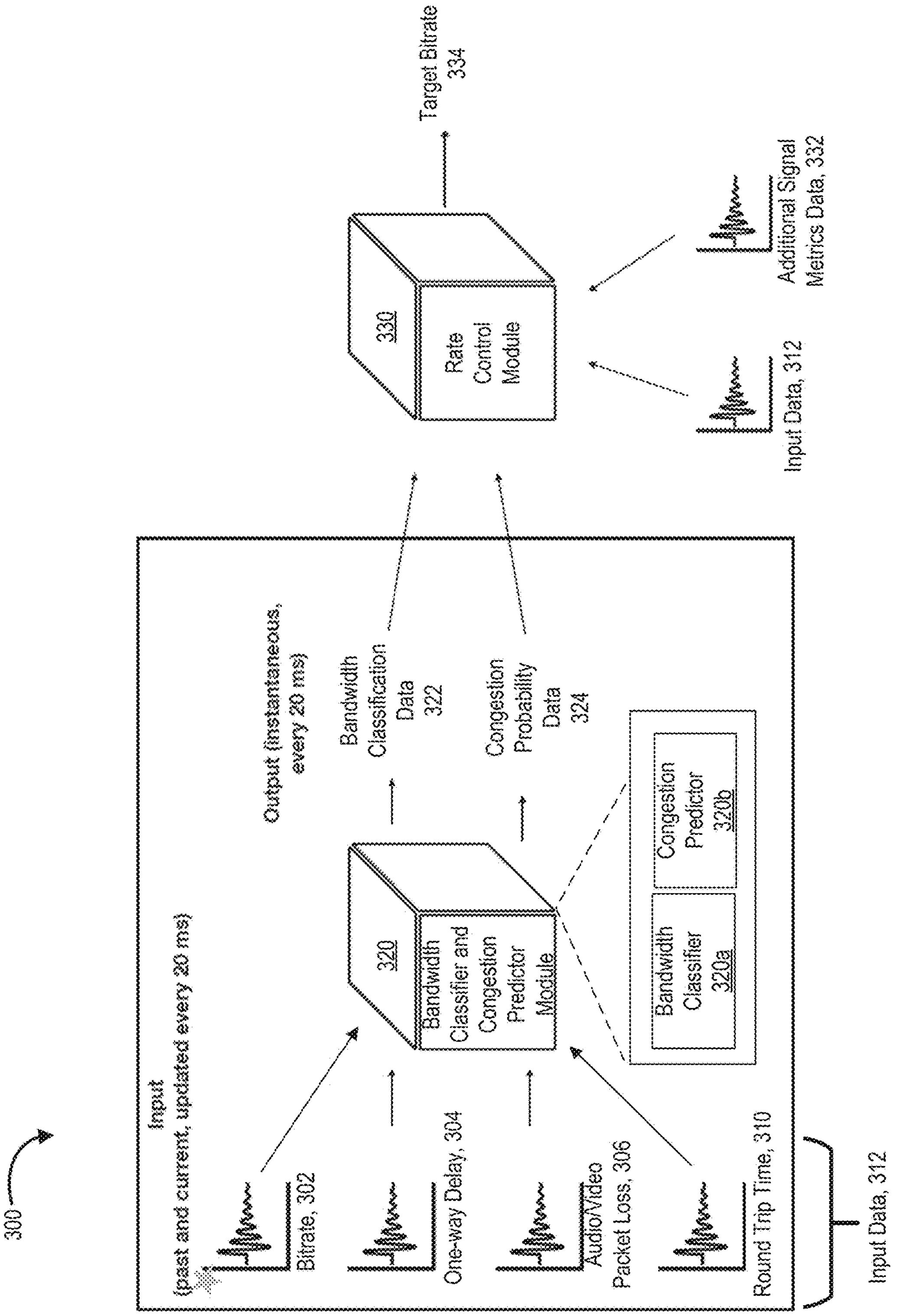
FIG. 3 shows an example of a bitrate adaption system.

FIG. 3 shows an example of a bitrate adaption system 300 of the data processing system 200 of FIG. 2. The bitrate adaption system 300 includes the bandwidth classifier and congestion predictor module 320. Although shown as a single module the bandwidth classifier and congestion predictor module can include two distinct processing engines 320*a* and 320*b*, each configured to generate a separate output distinct from the other engine. In some implementations the congestion predictor 320*b* can rely on the output of the bandwidth classifier 320*a*.

The bandwidth classifier and congestion predictor module 320 receives input data 312. As discussed in relation to FIG. 2, the input data 312 can include a detected bitrate 302, a one-way delay metric 304, audio/video packet loss levels 306, round trip time data 310, or any combination thereof.

The input data 312 can be particular to a specific network. For example, the bandwidth classifier and congestion predictor module 320 can be trained using input data 312 for a particular network, or for a particular network configuration. For example, the bandwidth classifier and congestion predictor module 320 can be trained in a Wi-Fi network. in another example the bandwidth classifier and congestion predictor module 320 can be trained in a cellular network. In each of these examples the bandwidth classifier made determine that bandwidth is changing such that bitrate should be controlled based on different characteristics in the bandwidth level relative to changes in bandwidth for a cellular network. In some implementations the bandwidth classifier and congestion predictor module 320 is trained for a particular device on a particular network. For example, a specific type of cell phone, computing device, or other user equipment can be a part of how the bandwidth classifier and congestion predictor module 320 is trained. The training of the module 320 can be based on the hardware of the particular device or any other particular characteristic of the particular device. For example, a particular device may have more or fewer antennas or antenna panels or may be configured to operate under a different type of network such as under a 4G or 5G cellular network. Based on these differences in device and in network the bandwidth classifier and congestion predictor module 320 can be specifically trained or otherwise configured to detect bandwidth changes that necessitate change in bitrate for that particular device and/or that particular network.

The bandwidth classifier and congestion predictor module 320 is configured to generate two outputs. The first output value for a bandwidth classification 322. The bandwidth classification 322 represents a determination of the bandwidth classifier 320*a* whether the bitrate should be changed or not. For example, the bandwidth classification data 322 may include a value that indicates that the bitrate exceeds the available bandwidth or that the bandwidth has otherwise changed such that the bitrate should be changed. In some implementations the bandwidth classification includes a single bit that represents whether bitrate should be lowered or not. In some implementations the bandwidth classification data includes a recommendation for what the bandwidth level will be in the near future and therefore what the bitrate should be in the near future (e.g., in the next 20 ms or until the bandwidth classifier is configured to recalculate the bandwidth classification).

The congestion probability output data 324 represents A probability value or a value between zero and one that represents the likelihood that the network is experiencing congestion at present, such as at present or within the next processing cycle (e.g., the next 20 ms). When the congestion probability output data 324 represents that the network is currently congested or will remain congested for the near future the data processing system 200 is configured to control the bitrate to remain slightly below the available bandwidth to enable congestion to clear. When the congestion probability output data 324 represents that congestion has cleared or that congestion will clear soon (e.g., within 20 ms), the data processing system 200 immediately increases the bitrate to fully utilize available bandwidth. This contrasts with a system that is configured to slowly ramp up the bitrate responsive to detecting that congestion queues are cleared, as is performed in legacy systems.

Each of the bandwidth classifier and congestion predictor of the module 320 can include a machine learning engine. in some implementations, the machine learning engine includes a long-short term memory (LSTM) machine learning engine. In some implementations the machine learning engine includes A neural network such as a convolutional neural network (CNN), a deep neural network (DNN), or other form of neural network. As previously stated, each of the bandwidth classifier and the congestion predictor of the module 320 can process the input data 312 nearly instantaneously, such as within 1 ms, to generate the bandwidth classification data 322 and the congestion probability data 324. The bandwidth classification data 322 and the congestion probability data 324 are each provided to a rate control module 330.

The rate control module 330 is configured to receive the bandwidth classification data 322 and the congestion probability data 324 and determine a target bitrate 334. The rate control module 330 determines an exact level of the target bitrate 334. The rate control module 330 is configured to instantaneously increase the bitrate to the target level 334 once the congestion probability data 324 indicates that the network is no longer congested and bandwidth classification data 322 indicate that the bandwidth level has stabilized. The rate control module 330 is configured to set a target bitrate 334 based on the available bandwidth level, which can be represented in the bandwidth classification data 322 or other outputs from the module 320. In some implementations, the rate control module directly receives the input data 312 that is received by the bandwidth classifier and congestion predictor module 320. In some implementations the rate control module receives additional signal metrics data 332 that represents other characteristics of the network that are not considered by the bandwidth classifier and congestion predictor module 320.

Figure 4A:
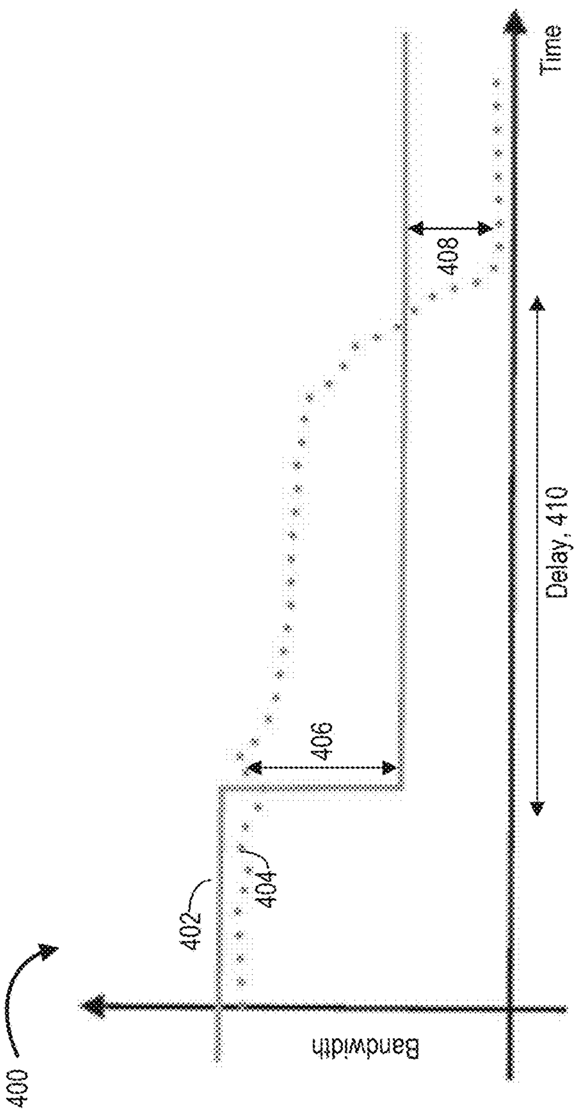
FIG. 4A shows an example of bandwidth correction without bandwidth classification and prediction.

FIG. 4A shows an example of bandwidth correction scenario 400 without bandwidth classification and prediction. As shown in the graph 400, a bandwidth level 402 sharply drops at a point in time. In this example, the drop 406 in bandwidth is between one and three megabits per second (Mbps). the bitrate level 404 does not decrease until a delay 410 has occurred. The controller for the bitrate determines during the delay that the bandwidth level 402 has dropped and is not increasing back to the prior level. Once the bitrate controller determines that the real bandwidth level 402 has dropped, the bitrate 404 is decreased to a level that is lower than that enabled by the real bandwidth level. The congestion builds up over the delay 410 is cleared during the underutilization period 408. as previously stated, the user experience is adversely impacted by both the built-up congestion during the delay 410 and by the lower bitrate during time period 408. In this example the bitrate controller will slowly increase the bitrate level 404 to utilize the real bandwidth level 402 over a time period, causing further issues with the user experience.

Figure 4B:
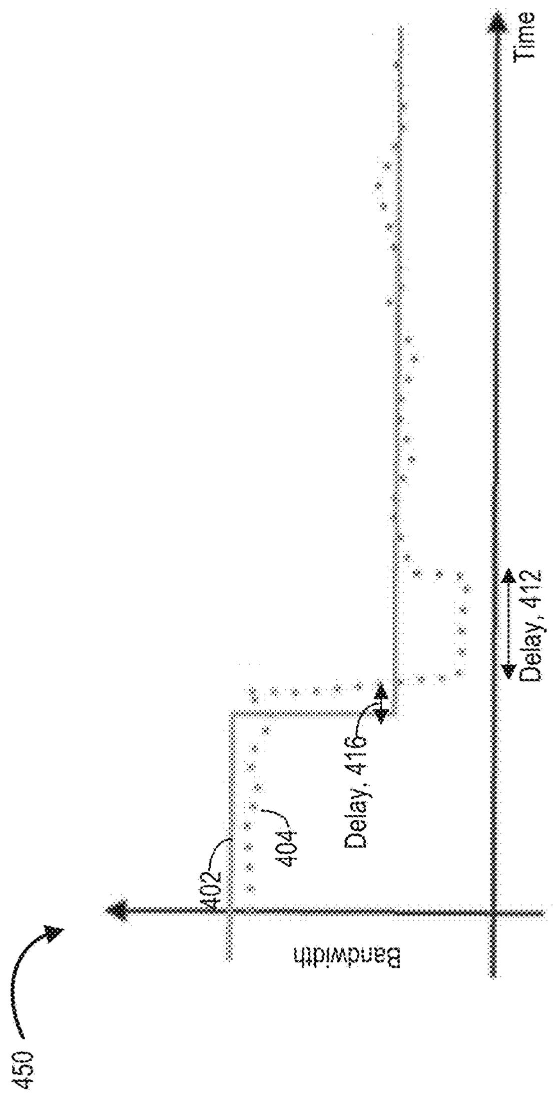
FIG. 4B shows an example of bandwidth correction based on bandwidth classification and prediction.

FIG. 4B shows an example of bandwidth correction scenario 450 based on bandwidth classification and prediction using the data processing system 200 previously described. As shown in graph 450 the bandwidth level 402 experiences a sharp drop like that described in reference to graph 400. In contrast to the bitrate controller of graph 400, the data processing system 200 is configured to immediately adjust the bitrate level 404. In contrast to the delay 410 of graph 400 a short delay 416 occurs before the data processing system 200 adjusts the bitrate level 404. The delay 416 is much shorter than the delay 410. the correction of graph 450 is based on the determined congestion probability data and predicted bandwidth data previously described in relation to FIG. 3. For example, the data processing system 200 detects the drop in bandwidth nearly instantly as being a substantial and sustained change in real bandwidth level

402. The data processing system immediately lowers the bitrate level 44 with a delay of less than one second. In this way, the data processing system 200 minimizes or prevents network congestion entirely.

A time period 412 occurs in with the Bitrate level 404 underutilizes real bandwidth level 402. During time period 412, the data processing system 200 determines that the network is still congested, or that the bandwidth level 402 has not stabilized or may not be stable soon. During the time period 412, The data processing system 200 determines that the bitrate 404 is not yet ready to return to fully utilize the real bandwidth level 402. The delay 412 can be as long as needed to either clear congestion or determine that the bandwidth level 402 has stabilized. For example, the delay 412 can be less than a second or up to several seconds. The delay 412 is subject to network conditions rather than subject to processing speed of the data processing system 200, because the data processing system recalculates the congestion probability and bandwidth classification with a high resolution, such as every 20 milliseconds.

After delay 412 occurs, the data processing system 200 determines that congestion probability of the network is below a threshold level. When the network congestion is no longer predicted, the data processing system 200 determines that the bitrate can be raised back to fully utilize the available bandwidth level 402. For example, the congestion probability detection engine can determine that it is unlikely that the network is presently congested or will be congested in the near future. Simultaneously, the data processing system determines that the real bandwidth level has stabilized. The data processing system 200 therefore corrects the bitrate level 404 to fully utilize the available bandwidth level 402.

Figure 5:
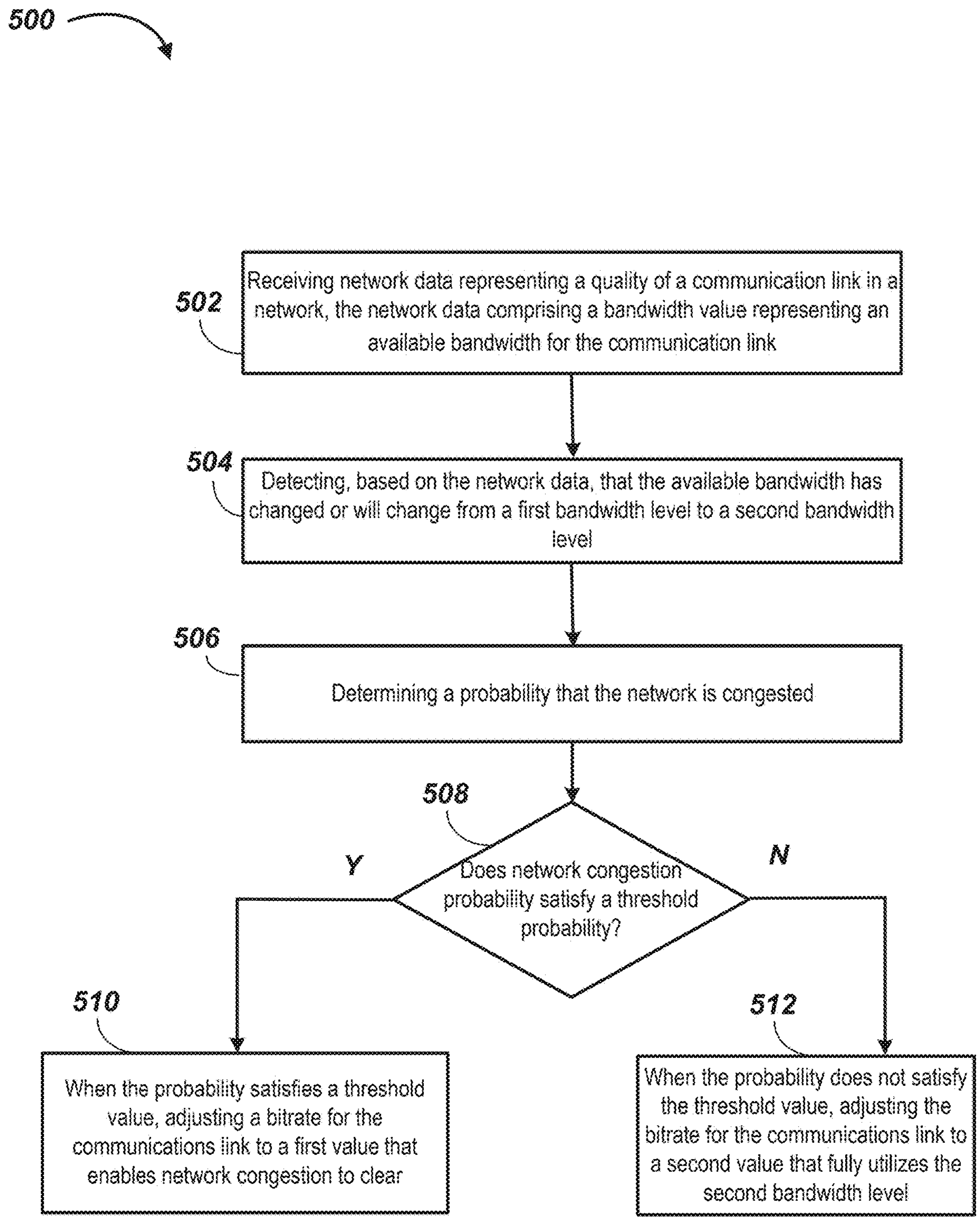
FIG. 5 shows a process for bandwidth classification and prediction.

FIG. 5 shows a process 500 for bandwidth classification and prediction. The process 500 can be executed by the data processing system 200 described previously in relation to FIGS. 1-4B. The process 500 includes receiving (520) network data representing a quality of a communication link in a network, the network data comprising a bandwidth value representing an available bandwidth for the communication link. The process 500 includes detecting (504), based on the network data, that the available bandwidth has changed or will change from a first bandwidth level to a second bandwidth level. The process 500 includes determining (506) a probability that the network is congested. A check is performed to determine (508) whether network congestion probability satisfies a threshold probability or not. When the probability satisfies a threshold value, the process 500 includes adjusting (510) a bitrate for the communications link to a first value that enables network congestion to clear. When the probability does not satisfy the threshold value, the process 500 includes adjusting (512) the bitrate for the communications link to a second value that fully utilizes the second bandwidth level.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

EXAMPLES

In the following sections, further exemplary embodiments are provided.

Example 1 includes a method for optimizing bitrate adaption to sudden bandwidth changes in real time communications based on inferred network characteristics. The method includes receiving network data representing a quality of a communication link in a network, the network data comprising a bandwidth value representing an available bandwidth for the communication link; detecting, based on the network data, that the available bandwidth has changed or will change from a first bandwidth level to a second bandwidth level; determining a probability that the network is congested; when the probability satisfies a threshold value, adjusting a bitrate for the communications link to a first value that enables network congestion to clear; and when the probability does not satisfy the threshold value, adjusting the bitrate for the communications link to a second value that fully utilizes the second bandwidth level.

Example 2 includes the method of example 1 or some other example herein, wherein detecting that the available bandwidth has changed or will change from the first bandwidth level to the second bandwidth level comprises executing a first machine learning engine that is trained with training data that associates values of the network data with changes in the available bandwidth for the communication link, wherein the change from the first bandwidth level to the second bandwidth level exceeds a threshold that set based on training of the first machine learning engine.

Example 3 includes the method of examples 1-2 or some other example herein, wherein the first machine learning engine is trained based on a network type, a device type, a communication link type, or a combination thereof.

Example 4 includes the method of examples 1-3 or some other example herein, wherein determining the probability that the network is congested comprises executing a second machine learning engine that is trained with training data that associates values of the network data with congestion levels for the network, wherein a threshold probability level that represents that the network is congested is set based on training of the second machine learning engine.

Example 5 includes the method of examples 1-4 or some other example herein, wherein the second machine learning engine is trained based on a network type, a device type, a communication link type, or a combination thereof.

Example 6 includes the method of examples 1-5 or some other example herein, wherein the network data includes software data including application performance metrics measured by a receiving device.

Example 7 includes the method of examples 1-6 or some other example herein, wherein the network data includes hardware data including a Wi-Fi strength, a reference signal receive power (RSRP), a reference signal receive quality (RSRQ), a signal to noise ratio (SINR), or a combination thereof.

Example 8 includes the method of examples 1-7 or some other example herein, wherein the network data includes service data generated by a transmitting device such as a server system.

Example 9 includes the method of examples 1-8 or some other example herein, wherein adjusting the bitrate for the communications link to the first value that enables network congestion to clear comprises adjusting the bitrate to be below the second bandwidth level.

Example 10 includes the method of examples 1-9 or some other example herein, wherein adjusting the bitrate for the communications link to the second value that fully utilizes the second bandwidth level comprises immediately stepping up the bitrate.

Example 11 includes the method of examples 1-10 or some other example herein, further comprising monitoring the available bandwidth with a periodicity that is less than 100 milliseconds.

Example 12 includes the method of examples 1-11 or some other example herein, wherein adjusting the bitrate for the communications link to the first value that enables network congestion to clear is configured to occur in less than one second.

Example 13 may include a signal as described in or related to any of examples 1-12, or portions or parts thereof.

Example 14 includes a datagram, information element, packet, frame, segment, PDU, or message as described in or related to any of examples 1-12, or portions or parts thereof, or otherwise described in the present disclosure.

Example 15 may include a signal encoded with data as described in or related to any of examples 1-12, or portions or parts thereof, or otherwise described in the present disclosure.

Example 16 may include a signal encoded with a datagram, IE, packet, frame, segment, PDU, or message as described in or related to any of examples 1-15, or portions or parts thereof, or otherwise described in the present disclosure.

Example 17 may include an electromagnetic signal carrying computer-readable instructions, wherein execution of the computer-readable instructions by one or more processors is to cause the one or more processors to perform the method, techniques, or process as described in or related to any of examples 1-16, or portions thereof.

Example 18 may include a computer program comprising instructions, wherein execution of the program by a processing element is to cause the processing element to carry out the method, techniques, or process as described in or related to any of examples 1-17, or portions thereof.

Example 19 may include a signal in a wireless network as shown and described herein.

Example 20 may include a method of communicating in a wireless network as shown and described herein.

Example 21 may include a system for providing wireless communication as shown and described herein.

Example 22 may include a device for providing wireless communication as shown and described herein.

What is claimed is:

1. A method, comprising:

receiving network data representing representing an available bandwidth for a transmission;

detecting, based on the network data, that the available bandwidth will change from a first bandwidth level to a second bandwidth level, wherein detecting that the available bandwidth will change from the first bandwidth level to the second bandwidth level comprises executing a first machine learning engine that is trained with training data that associates values of the network data with changes in the available bandwidth for the transmission, wherein the change from the first bandwidth level to the second bandwidth level exceeds a threshold that set based on training of the first machine learning engine;

classifying that the network is congested or not congested, wherein classifying that the network is congested or not congested comprises executing a second machine learning engine that is trained with training data that associates values of the network data with congestion levels for the network, wherein a threshold probability level that represents that the network is congested is set based on training of the second machine learning engine;

when the network is classified as congested, adjusting a bitrate for the transmission to a first value that enables network congestion to clear; or when the network is classified as non-congested, adjusting the bitrate for the transmission to a second value that fully utilizes the second bandwidth level.

2. The method of claim 1, wherein the first machine learning engine is trained based on a network type, a device type, a communication link type, or a combination thereof.

3. The method of claim 1, wherein the second machine learning engine is trained based on a network type, a device type, a transmission type, or a combination thereof.

4. The method of claim 1, wherein the network data includes software data including application performance metrics measured by a receiving device.

5. The method of claim 1, wherein the network data includes hardware data including a Wi-Fi strength, a reference signal receive power (RSRP), a reference signal receive quality (RSRQ), a signal to noise ratio (SINR), or a combination thereof.

6. The method of claim 1, wherein the network data includes service data generated by a transmitting device such as a server system.

7. The method of claim 1, wherein adjusting the bitrate for the transmission to the first value that enables network congestion to clear comprises adjusting the bitrate to be below the second bandwidth level.

8. The method of claim 1, wherein adjusting the bitrate for the transmission to the second value that fully utilizes the second bandwidth level comprises immediately stepping up the bitrate.

9. The method of claim 1, further comprising monitoring the available bandwidth with a periodicity that is less than 100 milliseconds.

10. The method of claim 1, wherein adjusting the bitrate for the transmission to the first value that enables network congestion to clear is configured to occur in less than one second.

11. One or more processors and a memory configured to perform operations comprising:

decoding network data representing an available bandwidth for a transmission;

determining, based on the network data, that the available bandwidth will change from a first bandwidth level to a second bandwidth level, wherein detecting that the available bandwidth will change from the first bandwidth level to the second bandwidth level comprises executing a first machine learning engine that is trained with training data that associates values of the network data with changes in the available bandwidth for the transmission, wherein the change from the first bandwidth level to the second bandwidth level exceeds a threshold that set based on training of the first machine learning engine;

classifying that the network is congested or not congested, wherein classifying that the network is congested or not congested comprises executing a second machine learning engine that is trained with training data that associates values of the network data with congestion levels for the network, wherein a threshold probability level that represents that the network is congested is set based on training of the second machine learning engine;

when the network is classified as congested, adjusting a bitrate for the transmission to a first value that enables network congestion to clear; or when the network is classified as non-congested, adjusting the bitrate for the transmission to a second value that fully utilizes the second bandwidth level.

12. The one or more processors and the memory of claim 11, wherein the first machine learning engine is trained based on a network type, a device type, a communication link type, or a combination thereof.

13. The one or more processors and the memory of claim 11, wherein the second machine learning engine is trained based on a network type, a device type, a transmission type, or a combination thereof.

14. The one or more processors and the memory of claim 11, wherein the network data includes software data including application performance metrics measured by a receiving device.

15. The one or more processors and the memory of claim 11, wherein the network data includes hardware data including a Wi-Fi strength, a reference signal receive power (RSRP), a reference signal receive quality (RSRQ), a signal to noise ratio (SINR), or a combination thereof.

16. The one or more processors and the memory of claim 11, wherein the network data includes service data generated by a transmitting device such as a server system.

* * * * *